(12) United States Patent
Bellotti et al.

(10) Patent No.: US 8,850,503 B2
(45) Date of Patent: Sep. 30, 2014

(54) SYSTEMS AND METHODS FOR PERSONALIZED TELEVISION VIEWING

(75) Inventors: Paul Bellotti, Cheyenne, WY (US); Christofer Hardy, Cheyenne, WY (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/601,056

(22) Filed: Aug. 31, 2012

(65) Prior Publication Data

US 2014/0063338 A1    Mar. 6, 2014

(51) Int. Cl.
*H04N 21/258* (2011.01)
*H04N 21/25* (2011.01)

(52) U.S. Cl.
USPC ............................... 725/114; 709/227

(58) Field of Classification Search
None
See application file for complete search history.

(56) References Cited

U.S. PATENT DOCUMENTS

| | | | |
|---|---|---|---|
| 2004/0025180 A1* | 2/2004 | Begeja et al. | 725/46 |
| 2006/0195583 A1* | 8/2006 | Bellifemine et al. | 709/227 |
| 2007/0067818 A1* | 3/2007 | Hjelm | 725/110 |
| 2007/0299833 A1* | 12/2007 | Viljamaa et al. | 707/4 |
| 2009/0264103 A1* | 10/2009 | Chen et al. | 455/411 |
| 2010/0077438 A1* | 3/2010 | Ansari | 725/91 |
| 2011/0187822 A1* | 8/2011 | Yoo | 348/43 |
| 2011/0197227 A1* | 8/2011 | Rouse et al. | 725/38 |
| 2011/0258654 A1* | 10/2011 | Lee et al. | 725/1 |
| 2012/0054634 A1* | 3/2012 | Stone et al. | 715/745 |
| 2012/0233653 A1* | 9/2012 | Yasrebi et al. | 725/114 |
| 2013/0027608 A1* | 1/2013 | Belisomi et al. | 348/441 |
| 2013/0128114 A1* | 5/2013 | Young | 348/484 |

* cited by examiner

*Primary Examiner* — Bennett Ingvoldstad
*Assistant Examiner* — Cynthia Fogg
(74) *Attorney, Agent, or Firm* — Ingrassia Fisher & Lorenz, P.C.

(57) ABSTRACT

A personalized television viewing system includes a head-end subsystem. The head-end subsystem includes a personality server configured to store a user preference regarding a television viewing format and a rendering server configured to provide digital media content in the television format of the user's preference. The viewing system further includes a client-end subsystem. The client-end subsystem includes a client server configured to electronically communicate with the head-end subsystem and provide the personality server with the user preference regarding the television viewing format.

13 Claims, 4 Drawing Sheets

SYSTEMS AND METHODS FOR PERSONALIZED TELEVISION VIEWING

TECHNICAL FIELD

The present disclosure relates generally to systems and methods for providing digital entertainment. More particularly, the present disclosure relates to systems and methods in which digital entertainment is presented according to the user's viewing format preferences.

BACKGROUND

The appetite for improved entertainment appears to be limitless. Consumers desire better access to and the option to select from a wider variety of entertainment forms such as television programming, music, web browsing, movies, video games, and the like. The modern world with seemingly endless amounts of multimedia content and varied delivery options gives the consumer a tremendous variety and range of options and choices. Cable and satellite television delivers hundreds of different television channels each carrying a different program. At the same time, the on-line services also offer a variety of different services to consumers, including electronic news, private message services, games, and other related downloadable services.

As digital entertainment continues to be produced in higher and higher resolutions, there is a drawback in that the user may not want to view the digital content at such higher resolutions, whether due to bandwidth limitations, viewing equipment or display device limitations, or other reasons. As such, there is a need in the art for systems and methods that will allow the user to view content at a desired resolution, and maintain a preferred user viewing experience, any display device. Furthermore, other desirable features and characteristics of the present disclosure will become apparent from the subsequent detailed description the appended claims, taken in conjunction with the accompanying drawings and background.

BRIEF SUMMARY

The various embodiments disclosed herein relate to systems and methods for providing digital entertainment that is presented according to the user's viewing preferences. In one embodiment, disclosed is a personalized television viewing system includes a head-end subsystem. The head-end subsystem includes a personality server configured to store a user preference regarding a television viewing format and a rendering server configured to provide digital media content in the television format of the user's preference. The viewing system further includes a client-end subsystem. The client-end subsystem includes a client server configured to electronically communicate with the head-end subsystem and provide the personality server with the user preference regarding the television viewing format.

In another embodiment, a method of providing personalized television viewing includes, at a head-end subsystem, receiving an electronic communication from a client-end subsystem regarding a user-preferred viewing format; storing, at a personality server of the head-end subsystem, the user-preferred viewing format; and transmitting, from a rendering server of the head-end subsystem, digital media content in the user-preferred viewing format.

In yet another embodiment, a method of providing personalized television viewing includes, at a client server of a client-end subsystem, receiving an electronic signal indicating a user presence and at the client server of the client-end subsystem, sending an electronic communication to a personality server of a head-end subsystem querying the personality server for a viewing format of the user's preference. The method further includes, at the client server of the client-end subsystem, receiving digital media content from a rendering server of the head-end subsystem in the viewing format of the user's preference.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

The disclosed embodiments will hereinafter be described in conjunction with the following drawing figures, wherein like numerals denote like elements, and wherein.

DETAILED DESCRIPTION

Figure 1:
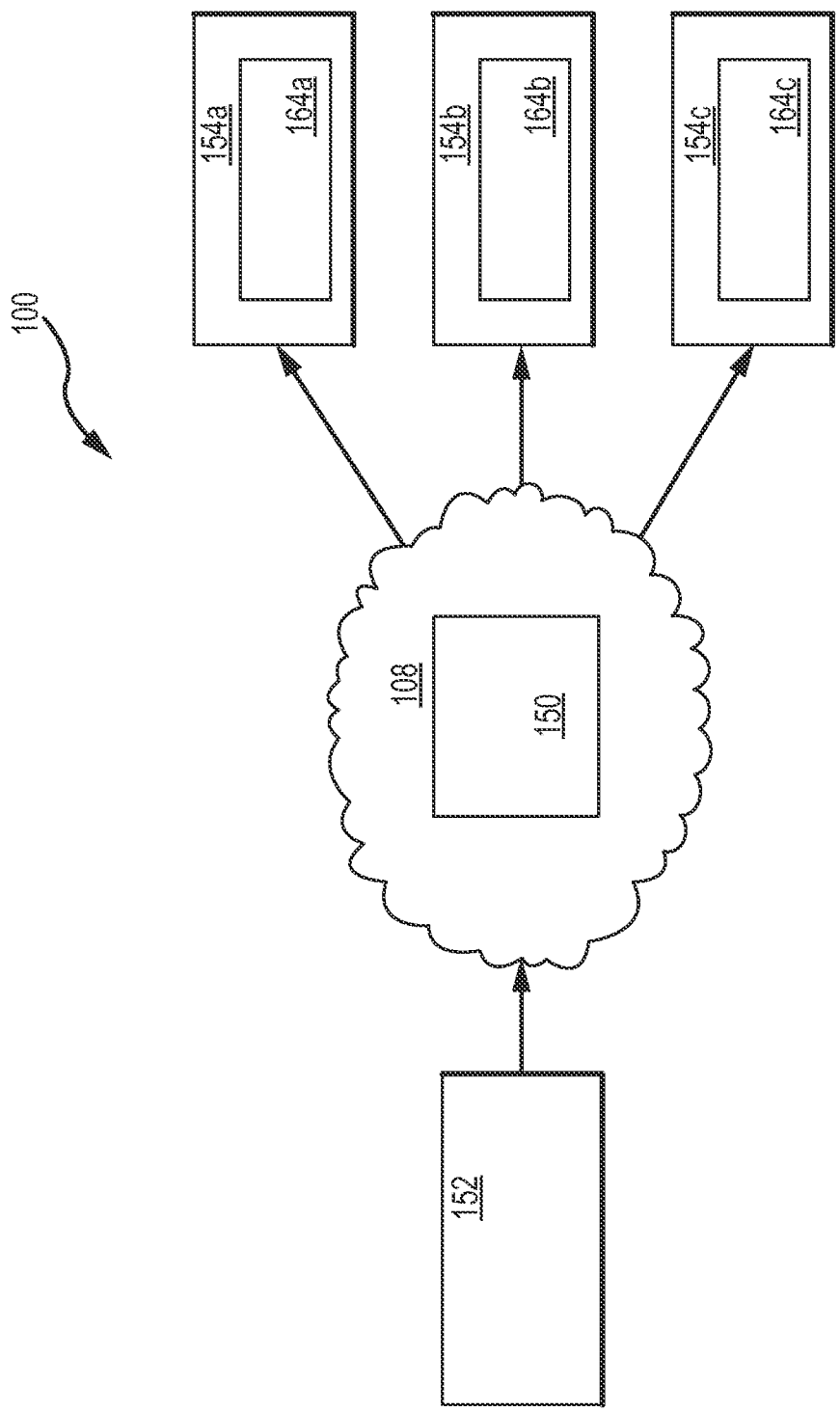
FIG. 1 is a block diagram illustrating functional elements of an example embodiment of a personalized television viewing system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the present disclosure are generally directed to delivering digital media content to a user in a preferred viewing format. As used throughout the description of the embodiments that follow, the term "viewing format" may broadly refer to one or more (in combination) of a particular bit rate, an encoding or compression scheme (e.g., MP3, MP4, AAC and so forth), a file size, a picture or video size (e.g., 640×480 pixels), for example. Likewise, the term "digital media content," as used herein, broadly refers to any media content that is rendered in digital form, including audio content, images, video content, and audio-video content, and the like.

Embodiments of a system in accordance with the present disclosure are configured for providing digital media content that is presented according to the user's viewing preferences. An exemplary system includes four subsystems, working in combination with one another to both receive an indication of a user's preferred viewing format and provide the user with digital media content in accordance with such format. Two of the four subsystems are "head-end" subsystems, which, as the term is generally understood in the art, are maintained and operated by a digital media content delivery service such as a satellite or cable television provider, for example. A third subsystem is a "client-end" subsystem, which is maintained and operated on a client digital media content receiving device, such as a set-top box (STB), for example. A fourth subsystem is a "user-end" subsystem, which is maintained and operated by a user or consumer of digital media.

With particular reference now to the components of the head-end subsystem, in a first aspect, one embodiment includes a personality server, which is a head-end subsystem that is configured to receive and store an end user's preferences regarding a preferred viewing format. In a second aspect, one embodiment includes a content rendering server, which is a head-end subsystem that is configured to provide digital content in one or more viewing formats as specified by the personality server. The personality server subsystem and the content rendering server subsystem are operated in combination to provide digital content in a user-preferred viewing format.

With particular reference now to the components of the client-end subsystem, one embodiment includes a client server embedded in client digital media content receiving device, such as a STB, television, personal computer, or smartphone, for example. The client server is configured to send electronic information from a user input to the head-end subsystems, for example viewing format preference information or user identification information, and receive digital media content from the head-end subsystems in accordance with the viewing format preference.

Further, with particular reference now to the components of the user-end subsystem, one embodiment includes a user electronic device, such as a mobile phone, smartphone, PDA, tablet computer, or the like that is configured (or that can be used) to uniquely identify a particular user. Identification can be accomplished, for example, by the user electronic device emitting an electronic signal, receivable by the client-end subsystem, with information regarding the user. Each of the four subsystems, head-end, user-end, and client-end will be described in greater detail below.

In operation, in accordance with an embodiment, when a user first communicates with the system (i.e., via the client-end subsystem), the user-end electronic device is used to uniquely identify the user. For example, the system pairs the user's mobile phone or other electronic device with the STB or other client-end device, again via an electronic signal emitted by the user-end electronic device. In this manner, the client server acts as an intermediary between the user-end electronic device and the head-end systems to identify and create a new viewing profile for this unique user.

The user is then presented with photos and/or video media in a plurality of viewing formats from a display device associated with the STB, for example a television. The user is prompted to select among the photos/videos and thereby indicate a viewing format that the user prefers. Information regarding the user's selection is then sent from the client-end subsystem to the head-end subsystem, particularly the personality server, wherein the information is electronically stored. By this process, a unique profile will be created on the personality server to build of information about how the user enjoys the viewing experience. Communication between the user and the personality server is thus facilitated by the client server. Thereafter, each time the client server recognizes the presence of this particular user by the presence of the user's electronic device, all digital media will be presented to the user in the previously selected viewing format.

In variations of this embodiment, a plurality of STBs or other client-end devices are provided as part of the system, each such STB including a client server configured to communicate with the head-end subsystems. As such, each client server is configured to pick up the user's unique identifier via the user-end electronic device and then provide the user with digital media in the user's preferred viewing format.

In further variations of this embodiment, the system may prompt/query the user more than one time, for example multiple times on the same viewing device or multiple times on different viewing devices, to ensure that the personality server receives the best possible information regarding the user's viewing format preferences.

In still further variations of this embodiment, the client server may be configured to recognize the presence of more than one user as viewing a particular viewing device, each such viewer having a unique profile stored in the personality server. In such instances, the system may attempt to compromise on the quality and resolution of the video, that is, provide a viewing format that is as close as possible to each of the user's individual preferences.

Reference is now made to FIG. 1, which depicts the various components of an exemplary system in accordance with the present disclosure. FIG. 1 is a block diagram illustrating functional elements of an example embodiment of a personalized television viewing system 100. The personalized television viewing system 100 includes a back-end rendering server subsystem 150, a back-end personality server subsystem 152, and a plurality of client-end client servers 154a-154c. Each subsystem 150, 152, and 154 is electronically coupled to one another via one or more electronic communication networks, such as communication system 108 as depicted in FIG. 1. In an embodiment, the rendering server subsystem 150 is electronically and communicatively coupled with the personality server subsystem 152 and the client servers 154a-154c. For example, the rendering server subsystem 150 may operate as a network-accessible computing resource, such as part of a hosted computing system in a data center, as part of a computing "cloud," or the like. The personalized television viewing system 100 facilitates the presentation by the client servers 154a-154c of an audio/video program that is provided in a viewing format as stored on and as indicated by the personality server subsystem 152. For example, the personality server subsystem 152 may be configured to indicate programs in a first viewing format, such as first bit rate. Again, as used throughout this detailed description, the term "viewing format" may broadly refer to a particular bit rate, encoding or compression scheme (e.g., MP3, MP4, AAC and so forth), file size, picture or video size (e.g., 640×480 pixels), and so on. The client servers 154a-154c may be configured to communicate and display via the display device associated therewith media content in the various viewing formats 164a-164c, as may be indicated. The personalized television viewing system 100 facilitates a preferable user viewing experience, by providing audio/video programs in a plurality of viewing formats 164a-164c, as shown in FIG. 1.

As such, examples of a digital media content distribution environment in which embodiments of a personalized television viewing system may be implemented are provided by FIG. 1. A set-top box is configured to access audio/video programs received from the communication system 108, such as a satellite or cable network. In this example, the rendering server subsystem 150 is located remotely from the client-end digital content receiving device, such as a set-top box, such as by executing upon a server computing system located in a data center. Additionally the content receiving device is located within a customer residence.

The personalized television viewing system allows a user operating the STB to remotely access digital media content received by the content receiving device in any viewing format as may be desirable to the user. In particular, the user operating the STB can view a particular digital media program that is received by, or stored upon, the receiving device in a preferred format as desired by the user. The personality server subsystem 152 indicates the requested program viewing format, which is then provided to the STB by the rendering server subsystem 150 for display upon the display device.

Figure 2:
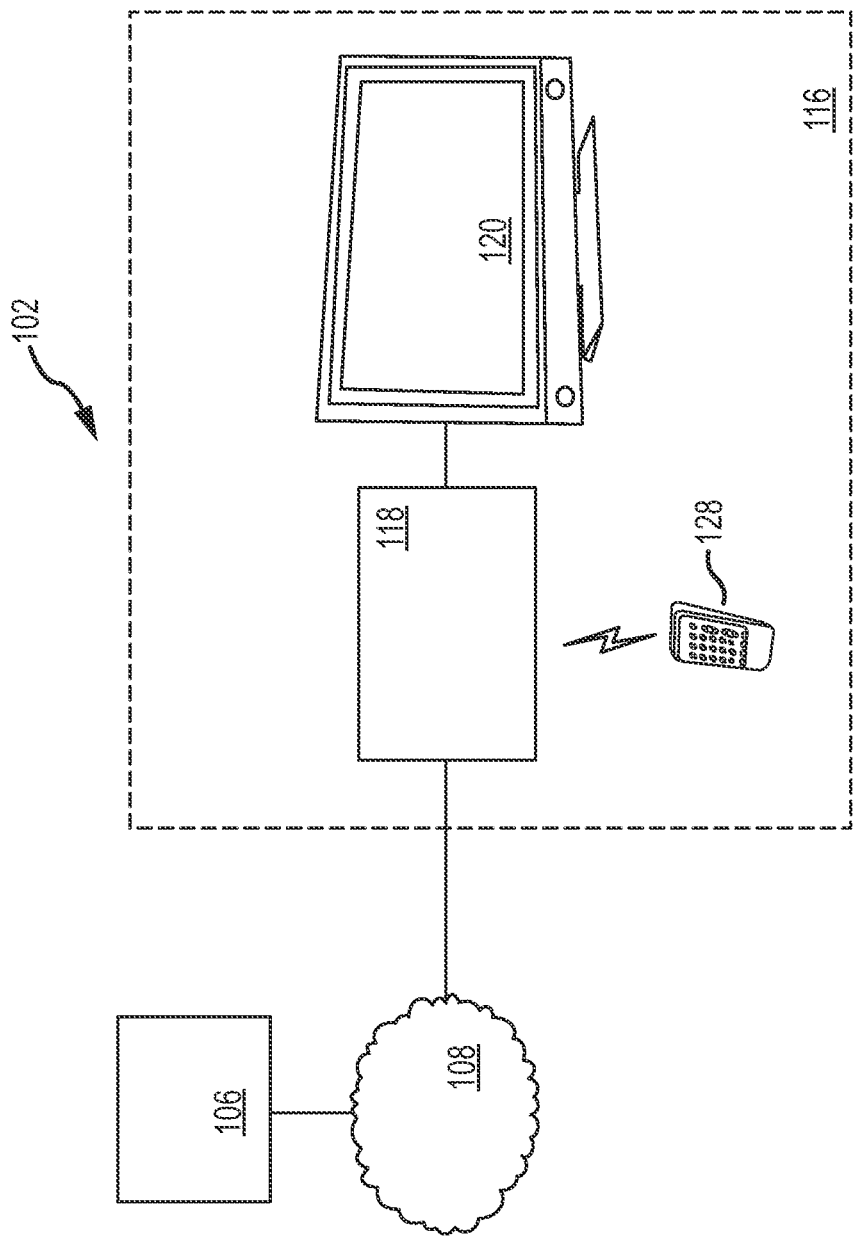
FIG. 2 is a block diagram illustrating a content distribution environment.

Before providing additional details regarding the operation and constitution of the elements of the personalized television viewing system 100, the content distribution environment 102 will be generally described with reference to FIG. 2. In the content distribution environment 102, audio, video, and/or data service providers, such as television service providers, provide their customers audio/video/data programming. Such programming is often provided by use of a content receiving device 118 communicatively coupled to a display device 120 configured to receive and display the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives programming by way of the communications media or sources described in greater detail below. Based upon selection by a user, the receiving device 118 processes and communicates the selected programming to the presentation device in a viewing format as desired by the user.

The receiving device 118 may be any suitable converter device or electronic equipment that is operable to receive programming. For convenience, the receiving device may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Further, the receiving device may itself include user interface devices, such as buttons or switches. In many applications, a remote-control device ("remote") 128 is operable to control the receiving device 118 and/or the display device. The remote typically communicates with the receiving device using a suitable wireless medium, such as infrared ("IR"), radio frequency ("RF"), or the like. In an embodiment, the user can indicate viewing format preferences through appropriate manipulation of the remote 128.

Examples of the display device 120 include, but are not limited to, a television ("TV"), a personal computer ("PC"), a sound system receiver, a digital video recorder ("DVR"), a compact disk ("CD") device, game system, cell phone, smartphone, electronic tablet, or the like. Display devices can employ a display, one or more speakers, and/or other output devices to communicate video and/or audio content to a user. Typically, one or more display devices 120 reside in a customer's premises and are communicatively coupled to one or more receiving devices 118. In some instances, the receiving device 118 and the display device 120 may be integrated into a single device.

A content provider (not shown) provides program content, such as television content or audio content, to a program distributor. Example content providers include television stations which provide local or national television programming, special content providers which provide premium based programming or pay-per-view programming, radio stations which provide audio programming, or the like.

Program content, interchangeably referred to as a program or digital media content, as noted above, is communicated to the program distributor 106 from the content provider through suitable communication media, generally illustrated as communication system 108 for convenience. Communication system 108 may include many different types of communication media or protocols, including telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

Programs may be communicated to the receiving device 118 in various ways. In one embodiment, programs are transmitted from the program distributor 106 to the receiving device 118 at least in part via a cable network that carries program data encoded as analog and/or digital signals. Such signals may contain a plurality of multiplexed (e.g., time division multiplexed) programs that are organized into distinct logical or physical channels. In another embodiment, the program distributor 106 transmits programs to the receiving device 118 via an Internet Protocol ("IP") network established over wire-based and/or wireless communication media. In other embodiments, the program distributor 106 transmits programs to the receiving device via a satellite network, comprising an uplink antenna, a satellite, and a receiver antenna coupled to the receiving device 118. In another embodiment, the receiving device 118 is coupled to an "over-the-air" ("OTA") broadcast antenna that is configured to receive a program signal from a terrestrial based transmitter, such as broadcast transmit tower.

The receiving device 118 processes, via an audio/video processor or similar component, a received program signal into a signal and/or format suitable for communication to a presentation device 120 or another device, such as a digital video recorder or a home computing system. Processing a received program signal may include demodulating, decompressing, decoding, decrypting, or similar operations to access program data that is encoded upon the received signal. Processing the received program signal may also include operations for making program data suitable for presentation upon another device, including translating the program data from one format into another, and re-encoding the converted program data upon an output signal, and the like. Further, the aforementioned subsystems of the personalized television viewing system 100 cooperate to display the programming in the user's preferred viewing format.

In an embodiment of the presently described system 100, the client server on the receiving devices determines the presence of a unique user via an electronic signal generated by an electronic device associated with such user, such as a cellular telephone, smart phone, PDA, laptop computer, personal media player, or the like. In this manner, a user can view programming received by the receiving device 118 in the user's preferred viewing format, without the need for any additional input by the user, once the user's profile has been created and stored.

The above description of the content distribution environment 102 and the customer premises 116, and the various devices therein, is intended as a broad, non-limiting overview of an example environment in which various embodiments of a personalized television viewing system may be implemented. FIG. 2 illustrates just one example of a content distribution environment 102 and that the various embodiments discussed herein are not limited to such environments. In particular, content distribution environment 102 and the various devices therein, may contain other devices, systems and/or media not specifically described herein.

Exemplary embodiments described herein provide applications, tools, data structures and other support to implement a personalized television viewing system that facilitates viewing of digital media content in a desired viewing format. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described is not limited by the particular order, selection, or decomposition of steps described with reference to any particular module, component, or routine.

Figure 3:
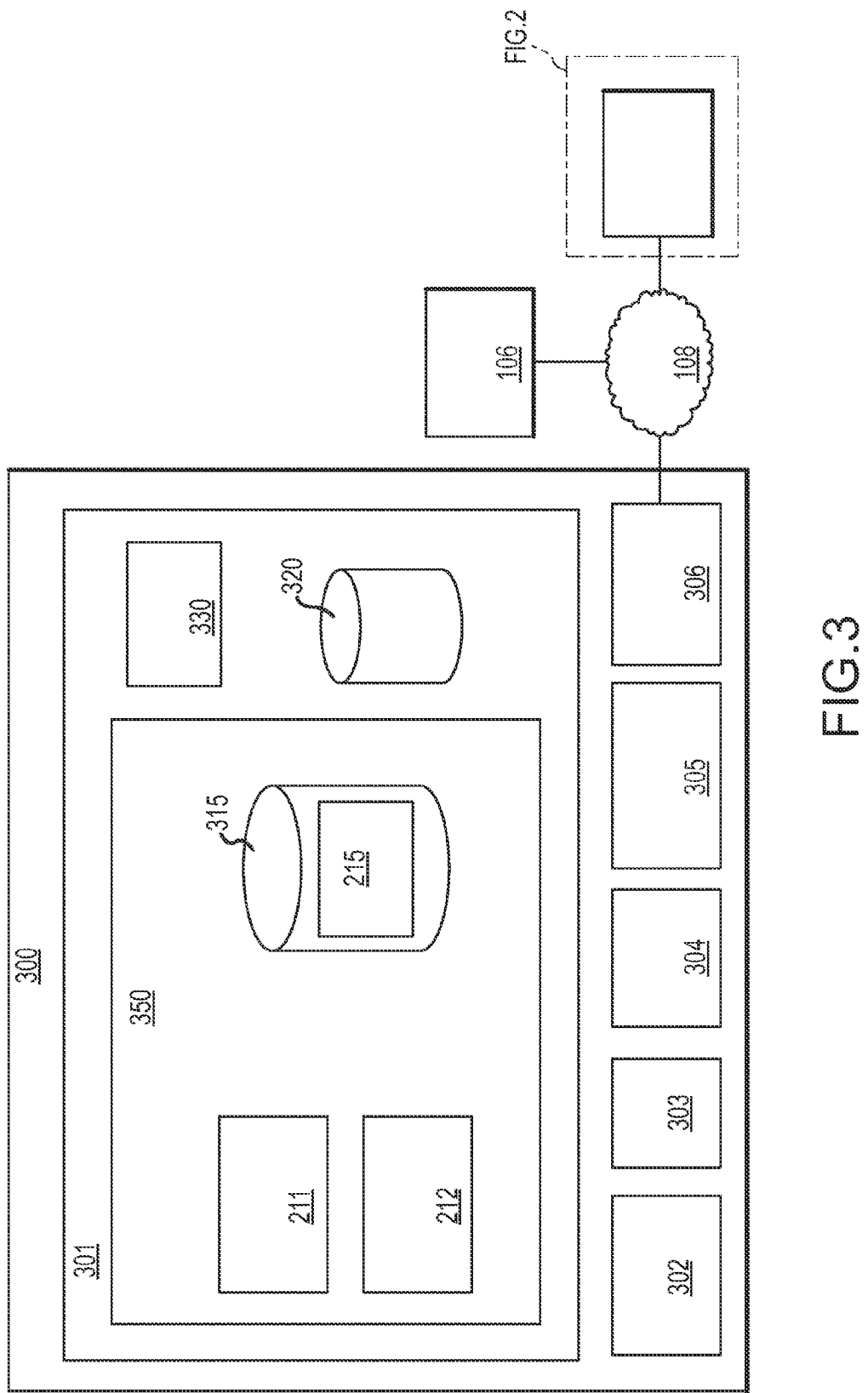
FIG. 3 is a block diagram of a computing system for implementing elements of an example embodiment of a personalized television viewing system.

FIG. 3 is a block diagram of a computing system for implementing elements of an exemplary embodiment of a personalized television viewing system. FIG. 3 shows a computing system 300 that may be utilized to implement a back-end subsystem 350 including a rendering server subsystem 211 and a personality server subsystem 212. In one embodiment, the computing system 300 is a server computing system that is located in a data center and that provides viewing format services for devices of multiple users.

Note that one or more general purpose or special purpose computing systems/devices may be used to implement the back-end subsystem 350. In addition, the computing system 300 may include one or more distinct computing systems/devices and may span distributed locations. Furthermore, each block shown may represent one or more such blocks as appropriate to a specific embodiment or may be combined with other blocks. Also, the back-end subsystem 350 may be implemented in software, hardware, firmware, or in some combination to achieve the capabilities described herein.

In the embodiment shown, computing system 300 includes a computer memory ("memory") 301, a display 302, one or more Central Processing Units ("CPU") 303, Input/Output devices 304 (e.g., audio processor, video processor, keyboard, mouse, CRT or LCD display, and the like), other computer-readable media 305, and network connections 306. The back-end subsystem 350 is shown residing in memory 301. In other embodiments, some portion of the contents, some of, or all of the components of the back-end subsystem may be stored on and/or transmitted over the other computer-readable media 305. The components of the back-end subsystem 350 preferably execute on one or more CPUs 303 and facilitate a personalized television view experience, as described herein. Other code or programs 330 (e.g., an administrative interface, a Web server, and the like) and potentially other data repositories, such as data repository 320, also reside in the memory 301, and preferably execute on one or more CPUs 303. Of note, one or more of the components in FIG. 3 may not be present in any specific implementation. For example, some embodiments may not provide other computer readable media 305 or a display 302.

In an embodiment, the back-end subsystem 350 includes a rendering server subsystem 211 and a personality server subsystem 212, and a data repository 315 that includes viewing format information 215. The back-end subsystem 350 may interact via the communication system 108 with the program distributor 106, such as in order to obtain information about users and/or devices that are authorized to view particular programs, to obtain information about devices (e.g., compatible and/or preferred viewing formats).

In addition, some embodiments include a viewing format application program interface ("API") that provides programmatic access to one or more functions of the back-end subsystem 350. For example, the API may provide a programmatic interface to one or more device management functions of the back-end subsystem 350 that may be invoked by one of the other programs 330 or some other module. In this manner, the API may facilitate the development of third-party software, such as user interfaces, plug-ins, adapters (e.g., for integrating functions of the back-end subsystem 350 into desktop applications), and the like.

In addition, the API may be in at least some embodiments invoked or otherwise accessed via remote entities, such as the program distributor 106, for example, to access the viewing format functionality of the back-end subsystem 350. For example, the program distributor 106 may periodically upload customer information via the API to provide the back-end subsystem 350 with a list of customers that are authorized to use services of the back-end subsystem 350.

In an exemplary embodiment, components/modules of the back-end subsystem 350 are implemented using standard programming techniques. For example, the back-end subsystem 350 may be implemented as a "native" executable running on the CPU 303, along with one or more static or dynamic libraries. In other embodiments, the back-end subsystem 350 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C#, Visual Basic- .NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a back-end subsystem implementation. Also, other functions could be implemented and/or performed by each component/module, and in different orders, and by different components/modules, yet still achieve the functions of the back-end subsystem.

In addition, programming interfaces to the data stored as part of back-end subsystem 350, such as in the data repository 315, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 315 may be implemented as one or more database systems, file systems, or any other technique for storing such information, or any combination of the above, including implementations using distributed computing techniques.

Furthermore, in some embodiments, some or all of the components of the back-end subsystem 350 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the subsystem components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the subsystem components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 4:
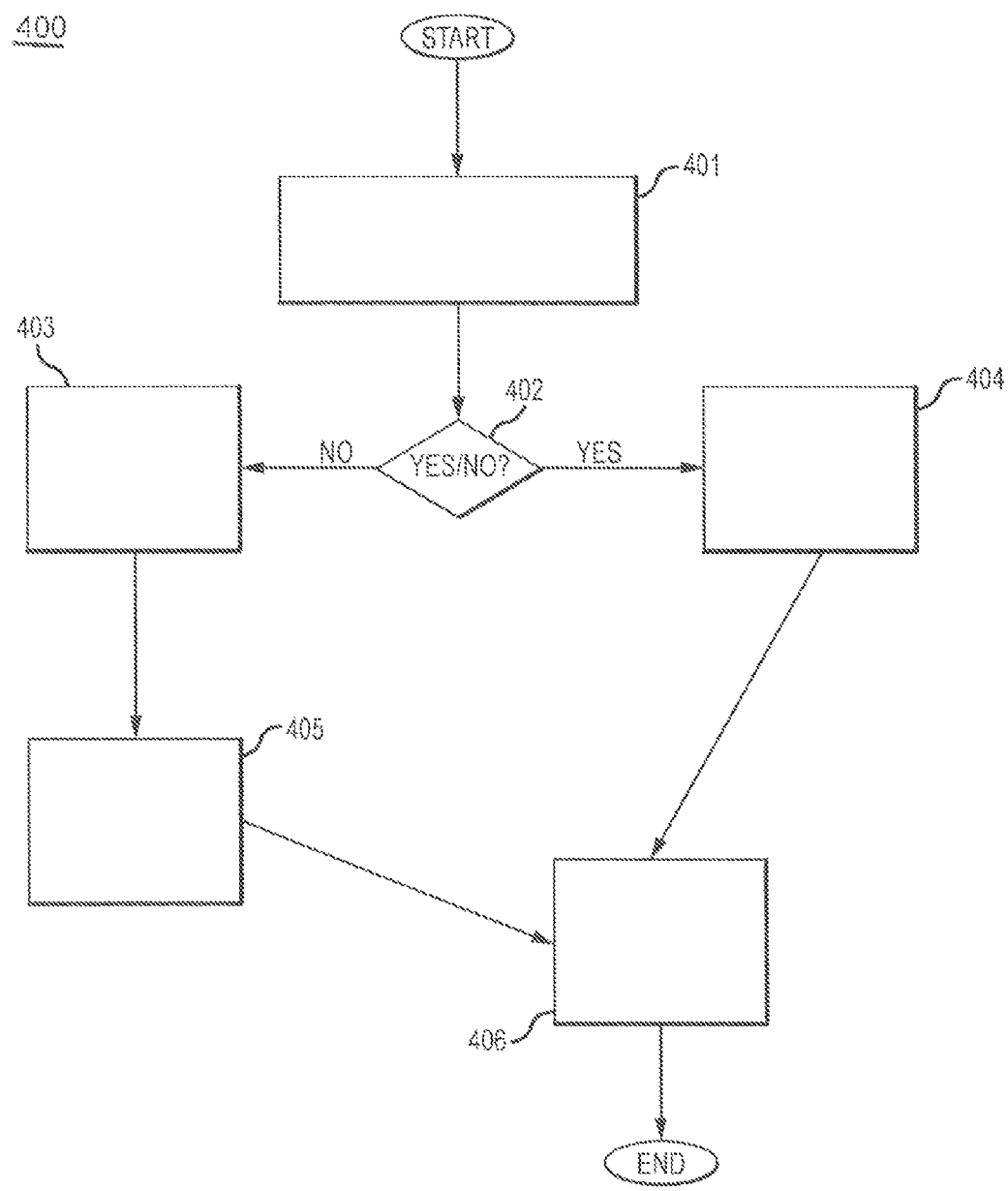
FIG. 4 is a flow diagram of an example process for providing a personalized television viewing experience in accordance with an exemplary embodiment.

FIG. 4 is a flow diagram of an exemplary process for providing a personalized television viewing experience in accordance with an embodiment. In particular, FIG. 4 illustrates process 400 that may be implemented by, for example, one or more elements of the personalized television viewing system 100 as described with respect to FIG. 1, 2, or 3. The process 400 facilitates the provision of digital media content in a desired viewing format to a digital media content receiving device, such as a set-top box (which houses a client server) and a content viewing device, the set-top box providing a program as data formatted in the desired viewing format.

In a first step 401, a user first communicates with the system via the presence (electronic signal emitted by) the user-end electronic device to uniquely identify the user. For example, the system pairs/identifies the user's mobile phone with the STB. A determination is made at step 402 if the system has previously received an input from this user. If the system does not recognize the user, the process proceeds to step 403. If the system does recognize the user, the process proceeds to step 404. In this manner, the client server acts as an intermediary between the user-end electronic device and the head-end subsystems.

With reference to step 403, in the event the user was not recognized, the user is then presented with photos and/or video media in a plurality of viewing formats. The user is asked which viewing format the user prefers. The user can input a selection at step 405 by, for example, pressing an appropriate button on a remote control device. By this process, a unique profile will be created on the personality server to build of information about how the user enjoys their viewing experience. Communication between the user and the personality server is facilitated by the client server. Such communication may occur via an electronic network, such as the Internet, to which both the client-end subsystem and the head-end subsystems may be connected.

Thereafter, each time the client server recognizes the presence of this particular user by the presence of the user's electronic device, all digital media will be presented to the user in the previously selected viewing format. As such, at step 406, the method includes presenting digital content to the user in the user's preferred viewing format. For example, the personality receives and stores the user's preferred viewing format, transmits an indication of such format to the back-end rendering server subsystem. The rendering server then provides digital media content via an electronic communication medium, such as a satellite, cable, or over-the-air transmission medium, to the client server. The client server in turn provides the digital media content to the display device in the user's preferred viewing format.

With reference to step 404, if the system does recognize the user, the client server sends an indication of the user to the personality server. The personality server retrieves the user's profile, for example, the user's preferred viewing format, and provides it to the rendering server. Thereafter, the process can continue to step 406, as described above, wherein all digital media will be presented to the user in the previously selected viewing format. As such, at step 406, the method includes presenting digital content to the user in the user's preferred viewing format.

In variations of this process, a plurality of STBs or televisions are provided as part of the system, each such STB or television including a client server configured to communicate with the head-end subsystems. As such, in step 401, each client server is configured to pick up the user's unique identifier via the mobile electronic device and provide the user with digital media in the user's preferred viewing format.

In further variations of this process, the system may query the user more than one time, for example multiple times on the same viewing device or multiple times on different viewing devices, to ensure that the personality server receives the best possible information regarding the user's viewing format preferences. As such, the process may repeat steps 403 and 405 a desired number of times, such as 1, 2, 3, 4, 5, or 6 times, for example. The process may repeat during consecutive viewing instances, at pre-determined time interval, or at any other desirable interval.

In still further variations of this embodiment, the client server may be configured to recognize the presence of more than one user as viewing a particular viewing device, each such viewing having a unique profile stored in the personality server. For example, steps 401 and 402 may lead to multiple determinations of multiple users, some of whom may have previously stored profiles and some of whom may not. In such instances, the system may attempt to compromise on the quality and resolution of the video, that is, provide a viewing format that is a close as possible to each of the user's individual preferences.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment, it being understood that various changes may be made in the function and arrangement of elements described and methods of preparation in an exemplary embodiment without departing from the scope of the invention, which is set forth in the appended claims and their legal equivalents.

What is claimed is:

1. A personalized television viewing system, comprising:
a personality server that stores a user preference regarding a television viewing format;
a rendering server that provides digital media content in the television format of the user's preference; and
a client server that electronically communicates with the personality server and provides the personality server with the user preference regarding the television viewing format,
wherein the client server receives a plurality of electronic signals from a plurality of user-end electronic devices indicating a presence of a plurality of users;
wherein the client server further determines whether each of the plurality of users has previously input a preference regarding a television viewing format by electronically querying the personality server,
wherein if the client server determines that one or more of the plurality of users has not previously input a preference regarding a television viewing format, the client server prompts the one or more users to input a preference regarding a television viewing format,
wherein the client server prompts the one or more users by displaying a plurality of images each in a different viewing format and requesting a selection from the user of one of the plurality of images, and
wherein if two or more of the plurality of users have different preferences regarding the television viewing format, the rendering server provides the digital media content in a viewing format that is based at least in part on the respective viewing preferences of each of the plurality of users, and wherein in each of the plurality of users have the same preference regarding the television viewing format, the rendering service provides the digital media content according to such preference.

2. The personalized television viewing system of claim 1, wherein the user-end electronic device is a cell phone, smartphone, or PDA.

3. The personalized television viewing system of claim 1, wherein the client server is further configured to receive an electronic input regarding the user preference.

4. The personalized television viewing system of claim 3, wherein the client server is housed in a set-top box associated with a display device.

5. The personalized television viewing system of claim 4, wherein the client server receives the electronic input from the user via a remote control device.

6. The personalized television viewing system of claim 1, wherein the personality server and the rendering server comprise a head-end subsystem that is located remotely from the client server, and wherein electronic communication between the head-end subsystem and the client server occurs over an electronic network.

7. The personalized television viewing system of claim 1, wherein if the client server determines that a user has previously input a preference regarding a television viewing format, the client server is configured to request the digital media content from the rendering server in the user's preferred viewing format.

8. The personalized television viewing system of claim 1, wherein the user preference regarding the television viewing format is a user preference regarding a bit rate.

9. A method of providing personalized television viewing, comprising:
detecting the presence of a plurality of users based on received electronic signals from a plurality of user-end electronic devices using a client server that receives the electronic signals from the plurality of user-end electronic devices;
determining whether each user of the plurality of users has previously input a preference regarding a television viewing format by querying a personality server using the client server, the personality server storing user preferences regarding a television viewing format;
if the client server determines that at least one user of the plurality of users has not previously input a preference regarding a television viewing format, performing sub-steps (a) through (e), below, and if, however, the client server determines that each of the plurality of users has previously input a preference regarding a television viewing format, performing only sub-step (e), below:
(a) prompting, using the client server, the at least one user to input a preference regarding a television viewing format;
(b) displaying, using the client server, a plurality of images each in a different viewing format and requesting, using the client server, a selection from the at least one user of one of the plurality of images;
(c) receiving at the client server an electronic input of the user preference(s) from the at least one user regarding the television viewing format;
(d) sending an electronic communication over an electronic network from the client server to the personality server regarding the user preference(s); and
(e) determining, by querying the personality server using the client server, whether the user preference of each user of the plurality of users is the same and if the user preference of each user of the plurality of users is the same, receiving digital media content from a rendering server at a head-end subsystem in the television viewing format of the users' preference, the rendering server providing digital media content in the television format of the user preference, however, if the user preference of each user of the plurality of users is not the same, receiving digital media content from the rendering server at the head-end subsystem in a television viewing format that is based on each respective viewing preferences of the plurality of users.

10. The method of claim 9, wherein a client-end subsystem comprising the client server provided in a set-top box associated with a display device receives the electronic input of the user preference.

11. The method of claim 10, wherein the electronic input of the user preference is received from a remote control associated with the set-top box.

12. The method of claim 11, wherein the head-end subsystem is provided remotely from the set-top box.

13. The method of claim 9, wherein the user preference regarding the television format is a bit rate.

* * * * *